United States Patent
Mouhouche

(10) Patent No.: US 8,306,000 B2
(45) Date of Patent: Nov. 6, 2012

(54) METHOD OF OPTIMISING THE RANK OF A MMSE CHANNEL EQUALISER

(75) Inventor: Belkacem Mouhouche, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 74 days.

(21) Appl. No.: 12/528,264

(22) PCT Filed: Feb. 22, 2007

(86) PCT No.: PCT/IB2007/051456
§ 371 (c)(1),
(2), (4) Date: Oct. 25, 2010

(87) PCT Pub. No.: WO2008/102217
PCT Pub. Date: Aug. 28, 2008

(65) Prior Publication Data
US 2011/0032919 A1 Feb. 10, 2011

(51) Int. Cl.
*H04L 25/03* (2006.01)
*H04B 1/16* (2006.01)
*H04B 7/216* (2006.01)

(52) U.S. Cl. ........ 370/335; 370/342; 375/147; 375/316; 455/334; 714/748

(58) Field of Classification Search ............... 370/335, 370/342; 375/147, 316; 455/334; 714/748
See application file for complete search history.

(56) References Cited

U.S. PATENT DOCUMENTS

| | | | | |
|---|---|---|---|---|
| 7,839,940 B2* | 11/2010 | Borran et al. | ................. | 375/260 |
| 7,944,985 B2* | 5/2011 | ElGamal et al. | ............. | 375/267 |
| 7,986,680 B2* | 7/2011 | Kim et al. | .................... | 370/341 |
| 2003/0115331 A1 | 6/2003 | Xie et al. | | |
| 2005/0088959 A1* | 4/2005 | Kadous | ........................ | 370/208 |
| 2006/0255989 A1* | 11/2006 | Kim et al. | .................... | 341/120 |
| 2007/0005749 A1* | 1/2007 | Sampath | ..................... | 709/223 |
| 2007/0195738 A1* | 8/2007 | Kim | ............................. | 370/335 |
| 2008/0037670 A1* | 2/2008 | Lee et al. | ..................... | 375/260 |

FOREIGN PATENT DOCUMENTS

| | | |
|---|---|---|
| EP | 1542378 A | 6/2005 |
| FR | 2823922 A1 | 10/2002 |
| WO | 2006065181 A1 | 12/2004 |

OTHER PUBLICATIONS

International Search Report and Written Opinion correlating to PCT/IB2007/051456 dated Jan. 4, 2008.
Nguyen, X., et al., "Reduced-Rank Adaptive Time-Domain Channel Estimation for OFDM Systems", Communications Systems, 2004. ICCS 2004. The Ninth International Conference on Singapore, China. Sep. 6-8, 2004. Piscataway, New Jersey, USA, IEEE, Sep. 6, 2004, pp. 135-139.
Moubouche, B., et al, "Asymptotic Analysis of Reduced Rank Ghip-Level MMSE Equalizers in the downlink of DCMA Systems", Signal Processing Advances in Wireless Communications, 2004 IEEE 5th Workshop on Lisbon, Portugal, Jul. 11-14, 2004, Piscataway, NJ, USA, IEEE, Jul. 11, 2004, pp. 434-438.

(Continued)

Primary Examiner — Alpus H Hsu

(57) ABSTRACT

An estimator of the throughput of a channel equalizer in a wireless receiver, wherein the estimator is dependent on a number of NACK messages transmitted by the receiver.

19 Claims, 5 Drawing Sheets

OTHER PUBLICATIONS

Dietl, G., et al., "Multi-Stage MMSE Decision Feedback Equalization for Edge", 2003 IEEE International Conference on Acoustics, Speech, and Signal Processing. Proceedings. (ICASSP). Hong Kong, Apr. 6-10, 2003, IEEE International Conference on Acoustics, Speech, and Signal Processing (ICASSP), New York, NY. IEEE, vol. 1 of 6, Apr. 6, 2003, pp. IV509-IV512.

Dietrich, F., et al., "On performance limits of optimum reduced rank Channel Estimation", Globecom 2002, IEEE Global Telecommunications conference, Taipei, Taiwan, Nov. 17-21, 2002, IEEE Global Telecommunications Conference, New York, NY, IEEE, vol. 1 of 3, pp. 345-349.

Burykh, S. et al., Reduced-Rank Adaptive Filtering Using Krylov Subspace, EURASIP Journal on Applied Signal Processing 2002, Hindawi Publishing Corporation, pp. 1387-1400.

Burykh, S., et al., "Multi-Stage Reduced-Rank Adaptive Filter With Flexible Structure", ENST Paris, Signal and Image Processing Dept., 46, rue Barrault, 75634 Paris Cedex 13, France, 4 pgs.

* cited by examiner

METHOD OF OPTIMISING THE RANK OF A MMSE CHANNEL EQUALISER

FIELD OF THE INVENTION

This invention relates to an estimator of the throughput of a channel equalizer, a Minimum Mean Squared Error (MMSE) channel equalizer optimizer, method of optimizing the rank of a Minimum Mean Squared Error (MMSE) channel equalizer.

BACKGROUND OF THE INVENTION

Referring to FIG. 1, in a mobile telecommunication system, data is typically transmitted from a base station (Node B) 10 to wireless receiver (User Equipment UE) 12 through a propagation channel. However, a direct channel path 14 between the base station 10 and the receiver 12 is rare, because of signal reflectance from buildings 16, 18, vehicles etc. Instead, a signal transmitted by the base station 10, normally travels by a number of different paths 20, 22, 24, 26 to the receiver 12, wherein the paths introduce different degrees of attenuation and phase shift into the signal.

A channel equalizer builds an adaptive model (R) of a communications channel (whose characteristics represent those of all the signal pathways between a base station and a receiver) and inverts the model to regenerate an originally transmitted signal (x) from a received signal (h). To calculate the coefficients of an MMSE equalizer, it is necessary to solve a linear system whose size is at least equal to the channel length. This can be done, for example, by inverting the received signal covariance matrix (whose size is equal to the channel delay spread). However, these channel inversion calculations may consume most of the resources of a digital signal processor (DSP) chip in a wireless receiver. A Minimum Mean Squared Error (MMSE) channel equalizer is an optimal linear equalizer in terms of mean squared error (MSE). To avoid the above problem, the coefficients of a reduced-rank MMSE equalizer can be calculated by inverting a matrix whose size is less than that of the covariance matrix. The size of the smaller matrix is known as the "rank". With this approach, the length of the equalizer remains the same, but the number of degrees of freedom to be optimized is reduced. The performance of a channel equalizer is dependent on its rank (or number of optimized coefficients in its channel model R). Reduced-rank MMSE equalizers where studied by S. Chowdhury et al. (in *Proc. 43rd IEEE Midwest Symp. on Circuits and Systems*, 2000). In these receivers, the number of taps to be optimized is limited to D (D<N). This allows a reduction in complexity and in some cases accelerated convergence.

HSDPA (High-Speed Downlink Packet Access) is an evolution of the third generation mobile telecommunications protocol UMTS (Universal mobile telecommunication system) which can achieve data rates of up to 14 mega bits per second (Mbps). However, even with reduced-rank MMSE equalizers, the increased data rates of the HSDPA protocol are proving difficult to achieve. French Patent Application FR0105268 (and S. Burykh and K. Abed-Meraim, *EURASIP Journal on Applied Signal Processing* 12 (2002), pp. 1387-1400), describe a method of adapting the rank of a reduced-rank filter to attain a target Signal to Interference plus Noise Ratio (SINR) in "short" code CDMA. However, in data packet networks (like HSDPA) the measure of performance is throughput (not SINR) and the codes are not "short" because of the presence of a scrambling code.

In addition to the above problem, since throughput depends on the detection of many symbols of a same packet, the throughput will flatten after a certain rank (known as the limit rank). Beyond this point, further increases in rank produce no increases in throughput. Thus, even if SINR continues to increase, throughput does not. Referring to the example depicted in FIG. 2, the equalizer has a limit rank of four. In other words, in this example, there is no need to increase the rank of the equalizer beyond four, because the throughput of the equalizer remains substantially the same even with further increases in rank.

SUMMARY OF THE INVENTION

According to the invention there is provided a an estimator of the throughput of a channel equalizer, a Minimum Mean Squared Error (MMSE) channel equalizer optimizer, method of optimizing the rank of a Minimum Mean Squared Error (MMSE) channel equalizer.

BRIEF DESCRIPTION OF THE DRAWINGS

An embodiment of the invention is herein described by way of example only, with reference to the accompanying figures in which.

DETAILED DESCRIPTION OF THE PREFERRED EMBODIMENT

Figure 1:
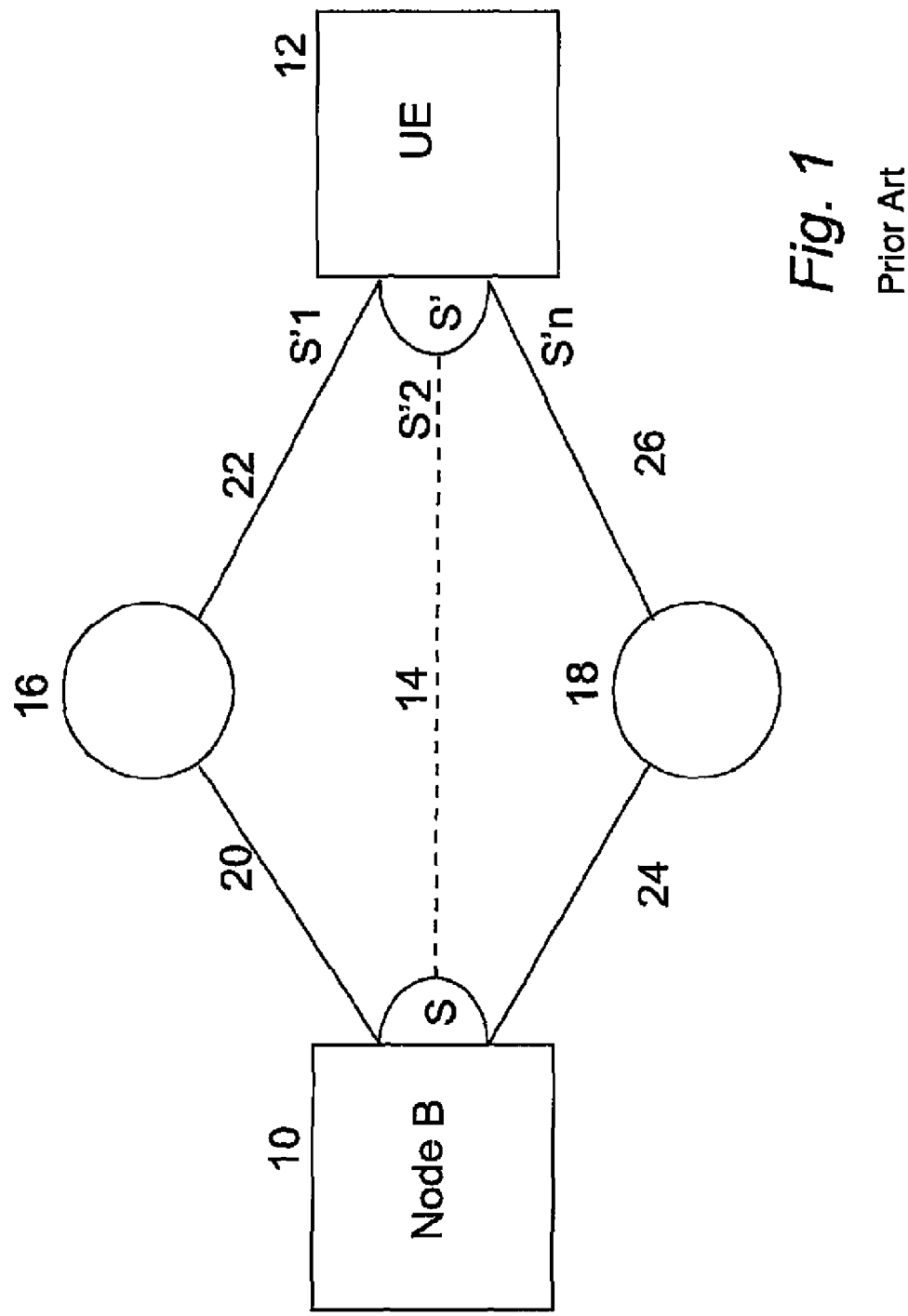
FIG. 1 is a block diagram of a communication between as base station and a wireless receiver.
Figure 2:
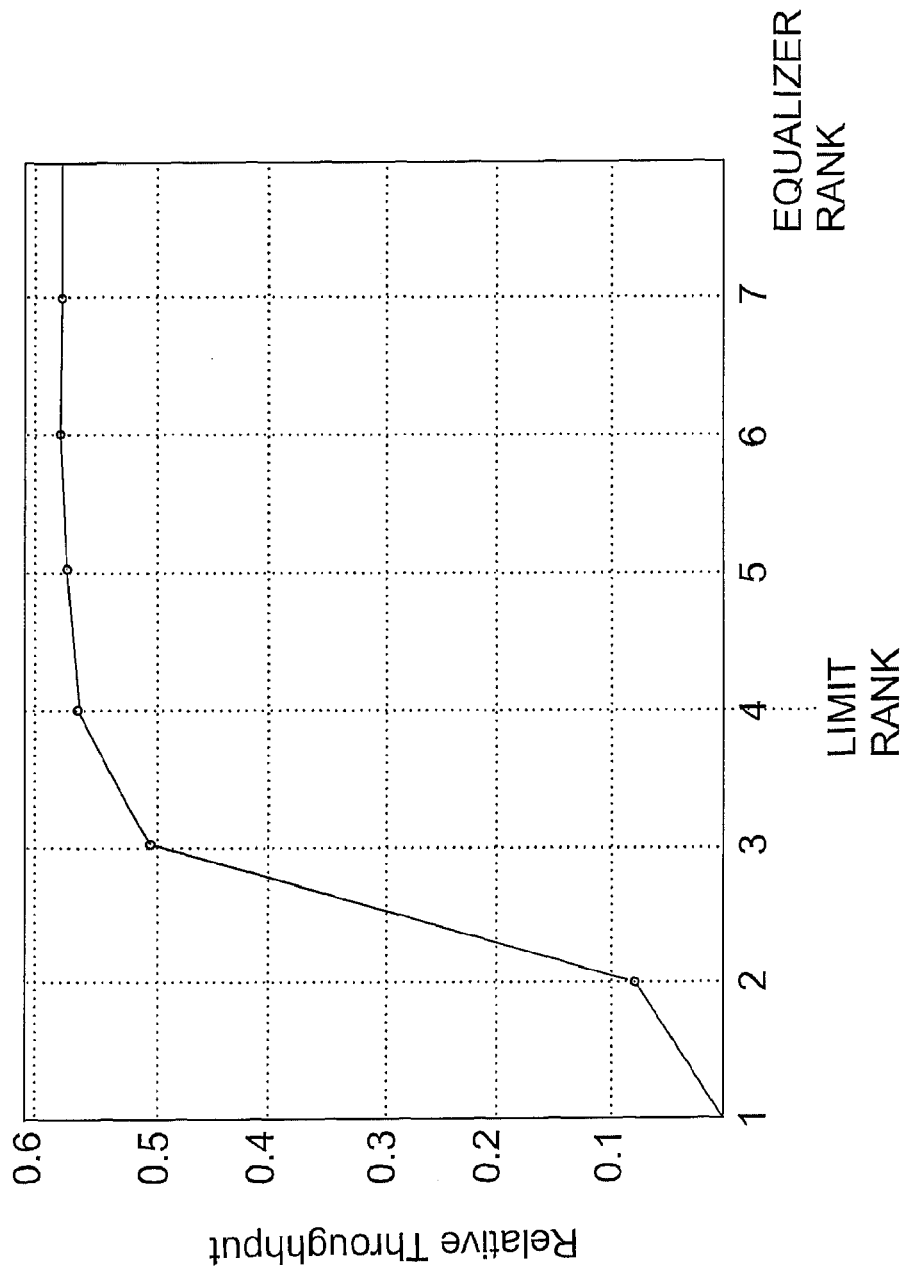
FIG. 2 is a graph of a relative throughout of a conventional reduced rank MMSE equaliser as a function of its rank.
Figure 3:
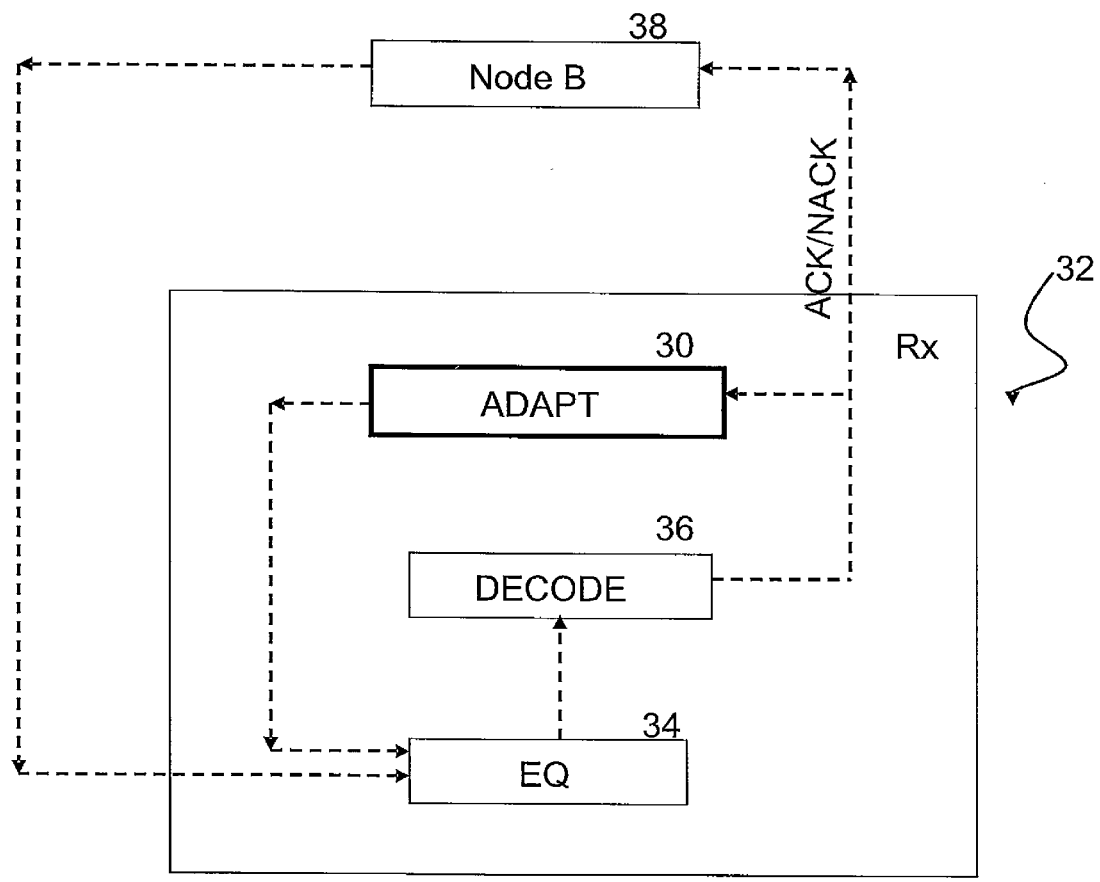
FIG. 3 is a block diagram of the equalizer adaptor of the present embodiment within a wireless receiver in communication with a base station.

Referring to FIG. 3, an equalizer adaptor 30 of the present embodiment is provided within a wireless receiver 32 comprising a reduced rank equalizer 34 (or an equalizer in the case of downlink long code CDMA) and a decoding component 36. In use, the equalizer adaptor 30 adapts the rank of the reduced rank equalizer 34 to attain a target throughput using the statistics of Positive Acknowledge (ACK) and negative Acknowledge (NACK) messages sent by the wireless receiver 32 to a base station 38.

More particularly, on receipt of a packet from the base station 38, the decoding component 36 (of the wireless receiver 32) attempts to decode the packet, and if successful, transmits a positive Acknowledge (ACK) message to the base station 38. Similarly, if the decoding component 36 is not successful, it transmits a Negative Acknowledge (NACK) message to the base station 38. Over a period of time and for a given data rate, it is clear that if no NACKs are received by the base station 38, then the throughput from the base station 38 to the wireless receiver 32, is at a maximum since all the packets transmitted by the base station 38 have been successfully decoded by a wireless receiver 32. Whereas, if the base station 38 receives only NACK messages, the throughput is zero since the wireless receiver 32 has not successfully decoded any packets. Thus, in between these two extremes, the throughput between a base station 38 and a wireless receiver 32 can be estimated from the number of NACKs (or the number of ACKs) received by the base station 38. Accordingly, the equalizer adaptor 30 is in communication with the decoding component 36 to receive the ACK/NACK messages transmitted to the base station 38. Depending on the statistics of the relative ratio of ACK to NACK messages, the equalizer adaptor 30 adapts the rank of the equalizer 34.

The equalizer adaptor 30 solves two problems, namely:
(a) determining the minimum rank necessary to attain a predefined target throughput; and
(b) determining the limit rank of the equalizer (or reduced rank equalizer).

Problem 1: Determining the Minimum Rank to Attain a Target Throughput

Figure 4:
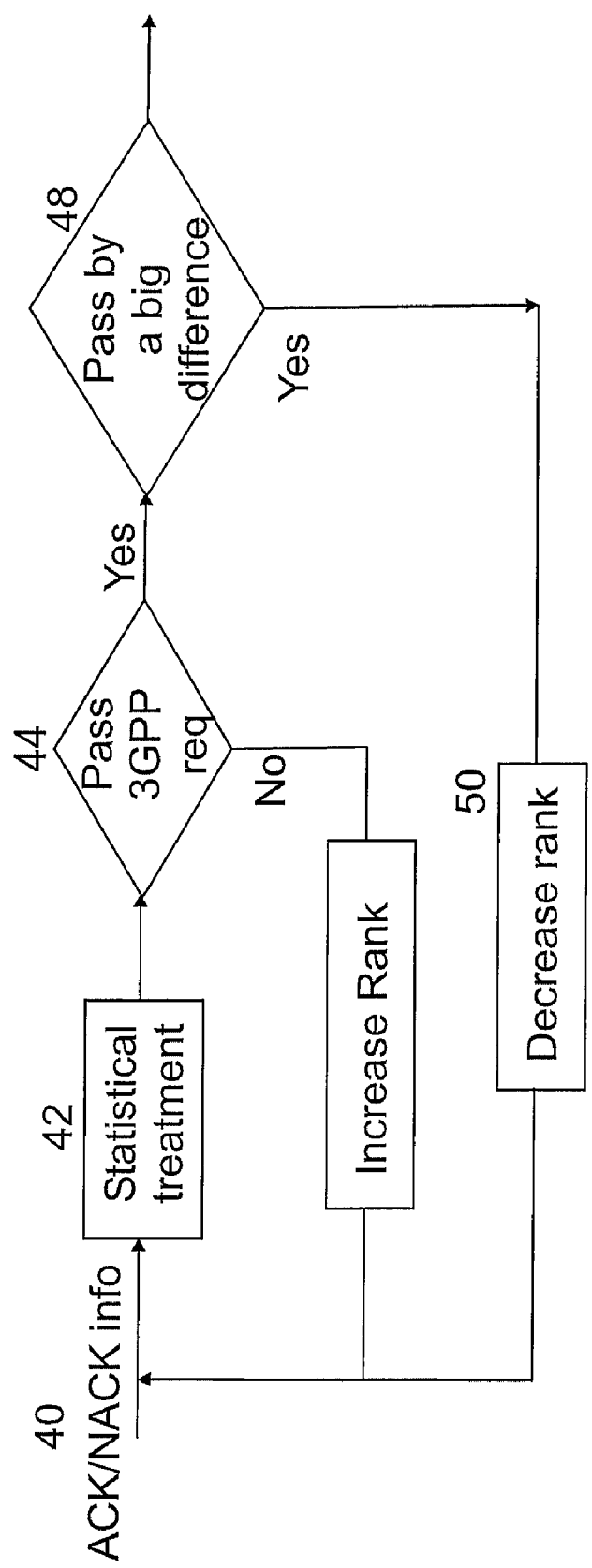
FIG. 4 is a flow chart of the operation of a method of adapting a channel equalizer in accordance with the present embodiment in determining the minimum equalizer rank necessary to attain a predefined target throughput.

Referring to FIG. 4, before commencing the operation of the equalizer adaptor, a target throughput (to for example, satisfy the demands of the telecommunications protocol being used) is established. Once communication occurs between the base station and wireless receiver, the equalizer adaptor receives 40 ACK/NACK messages from the decoding component of the wireless receiver. The equalizer adaptor counts 42 the number of NACK and ACK messages received over a pre-defined number of CDMA slots. If 44 the number of NACK messages exceeds a pre-defined threshold, the equalizer adaptor increases 46 the rank of the equalizer. Similarly, if 48 the number of NACK messages is less than another pre-defined threshold, the equalizer adaptor reduces 50 the rank of the equalizer.

The pseudo-code for these operations is as follows:

```
Maximum Throughput=A.
Initial RANK = D
Target Throughput= 0.5-0.6 A (for example)
Start receiving HSDPA.
Each T slots, calculate the statistics of ACK and NACKs,
If Number of NACKs >50%,
    Increase the equalizer rank
    D=D+1;
Else if number of NACKs <40%
    Decrease the equalizer rank.
    D=D-1;
End
```

This approach will allow a receiver to operate within the range 50%-60% of maximum throughput, while "minimizing" the equalizer rank (and thus the complexity)

It will also be recognised that the above optimisation procedure could also be implemented on the basis of the amount of time elapsed until a required number of ACK or NACK messages is received. In this case, the step of increasing or decreasing the equalizer rank is performed conditionally upon the elapsed time in question.

Problem 2: Determining the Limit Rank

Figure 5:
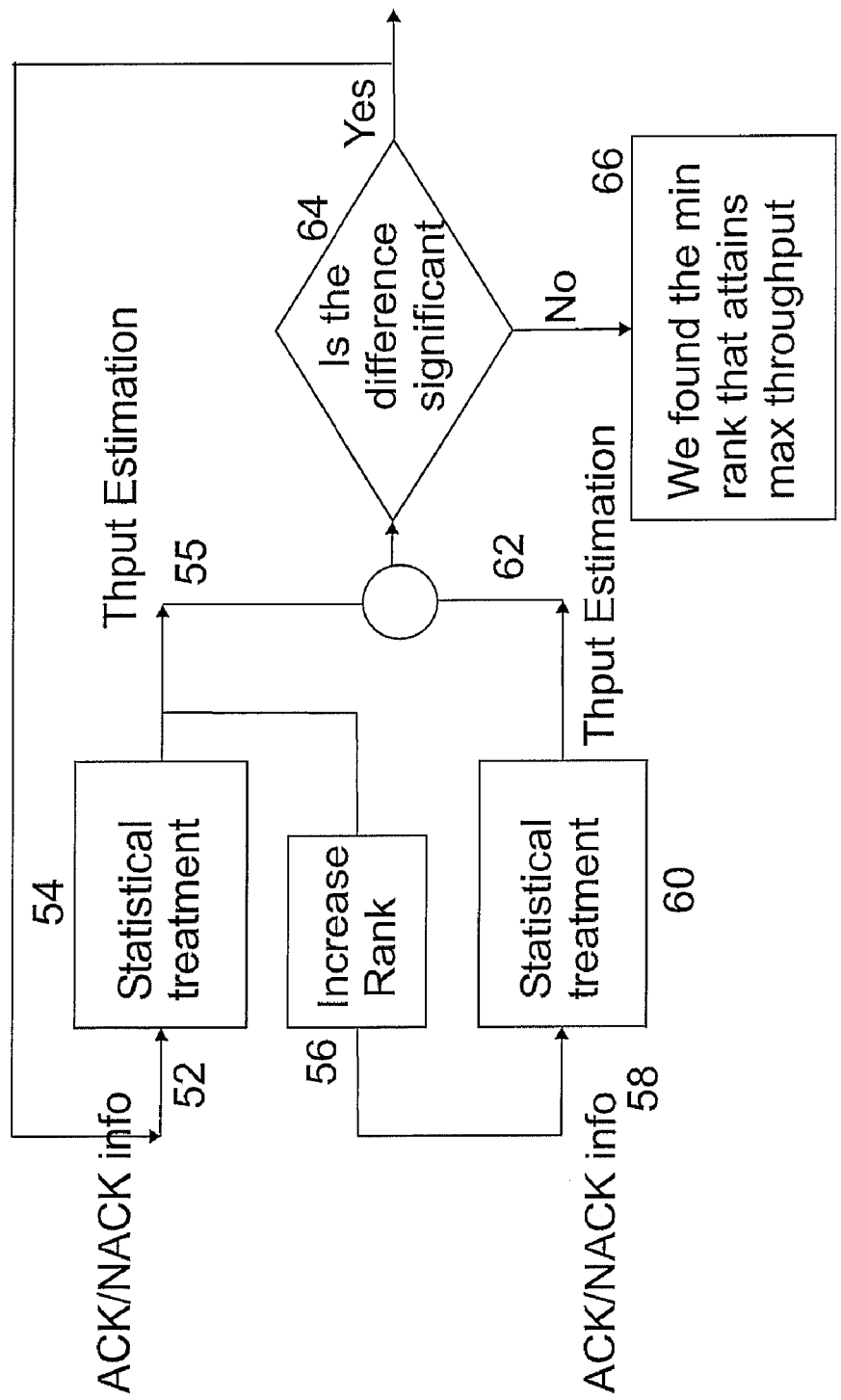
FIG. 5 is a flow chart of the operation of the method of adapting a channel equalizer in accordance with the present embodiment to determine the limit rank of the equaliser.

Referring to FIG. 5, in a first step, a first rank for the equalizer is established (not shown). Once communication occurs between the base station and wireless receiver, the equalizer adaptor receives 52 ACK/NACK messages from the decoding component of the wireless receiver. The equalizer adaptor counts 54 the number of NACK and ACK messages received over a pre-defined number of CDMA slots and calculates 55 a first throughput of the equaliser therefrom.

The rank of the equalizer is then increased 56 by a pre-defined amount and on further communication between the base station and wireless receiver, the equalizer adaptor receives further 58 ACK/NACK messages from the decoding component of the wireless receiver. The equalizer adaptor counts 60 the number of NACK and ACK messages received over a pre-defined number of CDMA slots and calculates 62 a second throughput of the equaliser therefrom.

The equalizer adaptor compares 64 the first and second throughputs. If a significant difference is found between the two throughputs, the rank of the equalizer is increased again 56 and the resulting throughput compared 64 against the previous throughput; and the rank of the equalizer incremented 56 again if substantial improvement in throughput is achieved. These steps of incrementing the rank of the equalizer and comparing the resulting throughputs of the equalizer based thereon are cyclically repeated until no further substantial increase in throughput is achieved 66 with increases in the rank of the equalizer.

The pseudo-code for this approach is as follows:

```
D= Initial RANK = 1
Start receiving HSDPA.
Each T slots, calculate the statistics of ACK and NACKs for rank D.
Increase D.
a) Calculate the statistics of ACK and NACKs for rank D+1
    If NACK(D)=NACK(D+1) (approximately equal)
        Decrease D.
    Else
        Increase D
    End
Go to a)
```

This approach will allow us to converge to the smallest rank giving the maximum throughput. More generally, the above approach enables the dynamic setting of the rank of the equalizer to avoid wasting computational resources of the wireless receiver, since the setting of this parameter is a key for balancing performance vs. consumption or vs. capabilities of the receiver. Further, it will be appreciated that the above operations of the equalizer adaptor are not incompatible with the prior art methods and could in fact be combined therewith.

It will be recognised that as in the previous optimisation procedure, the present procedure for determining the limit rank of an equaliser could also be implemented on the basis of the amount of time elapsed until a required number of ACK or NACK messages is received. In this case, the step of increasing or decreasing the equaliser rank is performed conditionally upon the elapsed time in question.

Modifications and alterations may be made to the above without departing from the scope of the invention.

The invention claimed is:

1. A method of optimizing a rank of a Minimum Mean Squared Error (MMSE) channel equalizer in a wireless receiver, the method comprising the steps of:
    transmitting negative acknowledge (NACK) and acknowledge (ACK) messages by the wireless receiver;
    calculating a number of ACK and NACK messages transmitted;
    calculating an estimator of a throughput of the MMSE channel equalizer; wherein the estimator is dependent on a number of NACK messages transmitted by the receiver;
    establishing a first and second thresholds for a percentage of NACK messages;
    adjusting the rank of the MMSE channel equalizer according to the throughput by increasing the rank if the percentage of NACK messages exceeds the first threshold;
    decreasing the rank if the percentage of NACK messages is less than the second threshold; and repeating the steps of adjusting and decreasing until the throughput of the MMSE channel equalizer equals a desired value.

2. The method of claim 1 wherein the step of transmitting the ACK and NACK messages is performed during a predefined number of code division multiple access (CDMA) slots.

3. The method of claim 2 wherein the step of calculating the estimator of the throughput of the MMSE channel equalizer comprises the step of calculating the percentage of NACK messages in the ACK and NACK messages transmitted.

4. The method of claim 2 wherein the first threshold has a value of approximately 50% and the second threshold has a value of approximately 40%.

5. The method of claim 1 wherein the step of estimating the throughput of the MMSE channel equalizer comprises the step of calculating the percentage of NACK messages in the ACK and NACK messages transmitted.

6. The method of claim 5 wherein the first threshold has a value of approximately 50% and the second threshold has a value of approximately 40%.

7. The method of claim 1 wherein the first threshold has a value of approximately 50% and the second threshold has a value of approximately 40%.

8. The method of claim 1 wherein the estimator comprises a ratio of the number of NACK messages transmitted by the receiver and a number of ACK messages transmitted by the receiver.

9. The method of claim 8 wherein the first threshold has a value of approximately 50% and the second threshold has a value of approximately 40%.

10. The method of claim 8 wherein the step of calculating the estimator of the throughput of the channel equalizer comprises the step of calculating the percentage of NACK messages in the ACK and NACK messages transmitted.

11. The method of claim 1 wherein the estimator is dependent on the amount of time required for a number of NACK or ACK messages to be transmitted by the receiver.

12. The method of claim 11 wherein the first threshold has a value of approximately 50% and the second threshold has a value of approximately 40%.

13. A method of determining a limit rank of a Minimum Mean Squared Error (MMSE) channel equalizer comprising the steps of:
   determining a first estimator of a throughput of the channel equalizer with a first-valued rank of the MMSE channel equalizer;
   determining a second estimator of the throughput of the MMSE channel equalizer with a second-valued rank of the MMSE channel equalizer;
   comparing a value of the second estimator with a value of the first estimator;
   determining a third estimator of the throughput of the MMSE channel equalizer, with a third-valued rank of the channel equalize being different than the second-valued rank, in an event that the value of the second estimator differs from the value of the first estimator;
   comparing a value of the third estimator with the value of the second estimator; and
   repeating the operations of comparing values of successive second and third estimators until the values of sequential estimators are equal.

14. The method of claim 13 wherein: the step of determining the first estimator includes counting a number of NACK and ACK messages transmitted by a receiver over a first set of slots; when the step of determining the second estimator includes counting a number of NACK and ACK messages transmitted by the receiver over a second set of slots; and wherein the step of determining the third estimator includes counting a number of NACK and ACK messages transmitted by the receiver over a third set of slots.

15. The method of claim 14 wherein the first set of slots are a predefined number of code division multiple access (CDMA) slots and the second set of slots are a predefined number of CDMA slots.

16. The method of claim 13 wherein the first estimator is dependent on a number of NACK messages transmitted by a receiver over a first set of slots and the second estimator is dependent on a number of NACK messages transmitted by the receiver over a second set of slots.

17. The method of claim 13 wherein: the first estimator comprises a ratio of a number of NACK messages transmitted by a receiver and a number of ACK messages transmitted by the receiver over a first set of slots; the second estimator comprises a ratio of a number of NACK messages transmitted by the receiver and a number of ACK messages transmitted by the receiver over a second set of slots.

18. The method of claim 13 wherein the first estimator is dependent on an amount of time required for a number of NACK or ACK messages to be transmitted by a receiver.

19. A wireless receiver comprising:
   a channel equalizer;
   a decoding component in communication with the channel equalizer, the decoding component to transmit an acknowledge (ACK) message to a base station in response to a received packet being successfully decoded, and otherwise to transmit a negative acknowledge (NACK) message; and
   an equalizer adaptor in communication with the channel equalizer and with the decoding component, the equalizer adaptor to calculate a number of ACK messages and a number of NACK messages transmitted, to calculate an estimator of a throughput of the channel equalizer based on the number of NACK messages transmitted, to establish first and second thresholds for a percentage of NACK messages, to increase a rank of the channel equalizer if the percentage of NACK messages exceeds the first threshold, to decrease the rank if the percentage of NACK messages is less than the second threshold, and to repeat the operations of increase the rank and decrease the rank until the throughput of the channel equalizer equals a desired value.

* * * * *